United States Patent Office 3,053,634
Patented Sept. 11, 1962

3,053,634
STABILIZATION OF HYDROGEN PEROXIDE
Daniel B. Luten, Jr., and Robert E. Meeker, Berkeley, Calif., assignors to Shell Oil Company, a corporation of Delaware
No Drawing. Filed Dec. 14, 1959, Ser. No. 859,127
10 Claims. (Cl. 23—207.5)

This invention relates to stabilization of hydrogen peroxide against decomposition. It relates to improved stabilizer compositions and to a new method of stabilizing hydrogen peroxide.

Quite a variety of stabilizers have been suggested for reducing the loss of hydrogen peroxide by decomposition during storage, shipment and use. Except in hydrogen peroxide of very low concentration, inorganic stabilizers have generally been preferred because the organic stabilizers previously known have had a relatively short effective life due to their susceptibility to attack by hydrogen peroxide of moderate or higher concentration. Sodium stannate has been one of the more popular inorganic stabilizers for $H_2O_2$ because of its effectiveness under varying conditions. Stannates have the disadvantage, however, of adversely affecting the color of epoxidation products, so the amount which can be used in hydrogen peroxide intended for use in the manufacture of such products must be kept below that desirable for the best stabilization.

An important object of the present invention is the provision of stabilized hydrogen peroxide comprising organic stabilizer which is preserved against attack by the peroxide. Another object is to stabilize hydrogen peroxide with a mixture of organic and inorganic stabilizers which provides long effective life of the stabilizers. A special object is to provide stabilized hydrogen peroxide which can be used safely in the production of epoxidation products of good color. Still other objects and advantages of the invention will be apparent from the following description in which certain preferred methods of application will be given by way of illustration but it will be understood that this is not intended to be restrictive since the principles of the invention can be applied in other ways which are also intended to be within the scope of the appended claims.

It has been found that hydrogen peroxide can be stabilized against decomposition during storage transportation and use by means of a special type of water-soluble organic chelating agent, provided there is also present a soluble aluminum compound and a soluble phosphate. By soluble compounds, as here referred to, is meant compounds having a solubility in water at about 15° C. of at least 10 parts per million.

The water soluble organic chelating agents which are used in the invention are those which have in their molecule at least one trivalent nitrogen atom to which at least two carboxyl groups are attached, said carboxyl groups being each linked to said nitrogen atom by a saturated aliphatic hydrocarbon group of not more than two carbon atoms. The carboxyl groups in these compounds can be in either the free acid form or in the form of salts. In other words, the chelating agents used are those which contain at least one N,N-dicarboxyalkylamino group, N—(R·COO·X)$_2$, wherein R is an alkylene radical of up to two carbon atoms and X is hydrogen or a salt-forming cation such, for instance as an alkali metal or alkaline earth metal or ammonium ion, the two indicated X's being the same or different. U.S. Patent 2,371,623 describes a number of chelating agents of this kind which can be successfully used together with a soluble aluminum compound and a soluble phosphate, in the new compositions of the invention. Especially advantageous are those chelating agents which contain a plurality of N,N-dicarboxyalkylamino groups in the molecule, especially those having at least two adjacent carbon atoms to each of which is directly attached at least one of said N,N-dicarboxyalkylamino group. In copending application of Robert E. Meeker, Serial No. 777,209, filed December 1, 1958, there is described a particularly suitable sub-group of compounds of this preferred type, namely, the water-soluble N,N-(dicarboxyalkyl)amino-substituted carbocyclic compounds having a saturated carbocyclic ring with at least two adjacent ring carbon atoms each directly linked to the nitrogen atom of an N,N-di(carboxyalkyl)amino group containing up to two carbon atoms in each of said alkyl radicals. Typical of the hydrogen peroxide stabilizers of this type which are described are the water-soluble 1,2-diaminocycloalkane-N,N,N'N'-tetraacetic acids and their salts having 5 to 18 carbon atoms in the cycloalkane radical, such as 1,2-diaminocyclopentane-N,N,N',N'-tetraacetic acid, disodium 1,2-diaminocyclohexane-N,N,N',N'-tetraacetic acid, tetra-potassium 1,2-diaminoperhydronaphthalene-N,N,N', N'-tetraacetic acid, tri-ammonium 4,7-diisobutyl-1,2-diaminoperhydronaphthalene-N,N,N',N' - tetraacetic acid and the like. By the present invention the effectiveness of these stabilizers can be increased and other types of water-soluble chelating agents having at least one trivalent nitrogen atom to which at least two carboxyl groups are directly attached, said carboxyl groups being each linked to said nitrogen atom by a saturated aliphatic hydrocarbon group of not more than two carbon atoms can be made effective stabilizers for hydrogen peroxide.

An especially useful type of such other chelating agent which can be used in the invention is the water-soluble alkylene polyamino polycarboxylic acids having up to three carbon atoms in the carboxylic acid groups and their salts such as ethylenediamine-N,N,N',N'-tetraacetic acid which is sold by Geigy Chemical Corporation under the trade name Sequestrene and its tetrasodium salt sold by Dow Chemical Company as Versene; 1,2-diaminopropane-N,N,N',N'-tetraacetic acid; 1,3-diaminopropane-N,N,N',N'-tetrapropionic acid; 1,2-diaminobutane-N,N, N',N'-tetraacetic acid; 2,3-diaminobutane-N,N,N',N'-tetraacetic acid; and the like and their soluble mono-, di-, tri- and tetra-alkali metal, alkaline earth metal and ammonium salts. Representative examples of aromatic polyamino polycarboxylic acids which can be used as such or in the form of water-soluble salts are: orthophenylenediamine-N,N,N',N'-tetraacetic acid; 3,4-diaminobiphenyl-N,N,N',N'-tetraacetic acid; 1,2-diaminoanthracene-N,N,N',N'-tetraacetic acid, 1,2,3-triaminobenzene-N,N,N',N',N'',N''-hexaacetic acid, and the like. All of these compounds can be produced by reacting the corresponding amines with halocarboxylic acids using the method of U.S. Patent 2,130,505 for example.

The soluble phosphate compounds which can be used with the chosen polycarboxyalkyl amine chelating agent and aluminum compound can be any of the numerous phosphates which form complexes with heavy metal ions in aqueous solutions. Orthophosphates, and metaphosphates, for example, can be used but the polyphosphates such as the pyrophosphates, the polymetaphosphates, particularly the hexametaphosphates, the tripolyphosphates and the tetraphosphates, for instance offer special advantages in the invention. The soluble phosphates are preferably added in the form of their salts, the alkali metal salts, especially the sodium and potassium salts, being particularly useful because of their availability and low cost, although ammonium or other soluble salts can be employed, as can the corresponding free acids. Salts corresponding to complete or partial neutralization of the acid, for instance, primary salts such as $Na_2HPO_4$ or tertiary salts such as $Na_3PO_4$ can be added to the hydrogen peroxide in making the compositions of the invention. Instead of inorganic salts one can use amine salts or phosphate esters of any of the previously indicated phosphorus-containing acids although as a general rule these are more expensive and offer no compensating advantages so are less desirable.

A variety of soluble aluminum compounds are also available for the preparation of the new compounds. As a general rule inorganic aluminum compounds will be used rather than organic compounds because of the tendency of the latter to cause loss by reaction with the hydrogen peroxide. There may be special circumstances in which such reaction may not be unduly detrimental considering the advantage to be obtained from the resulting dissolved aluminum. In such cases an organic aluminum compound can be added. This is especially the case with highly dilute hydrogen peroxide, for example 3 to 6% solutions intended for medicinal applications for instance, which are ont such powerful oxidation agents as the more concentrated solutions. With such solutions addition of certain types of organic aluminum compounds may have advantages for special purposes. Examples of organic aluminum compounds which can thus be used are: aluminum di- and tri-acetates, aluminum lactate, aluminum benzoate, aluminum salicylate, aluminum sulfanilate, aluminum benzene sulfonate, aluminum barbiturate, and the like. As a rule, however, inorganic aluminum compounds will be more advantageous both because of their generally lower cost and more ready availability and because of their greater resistance to reactions which lead to hydrogen peroxide loss. The chosen aluminum compound should be substantially free from heavy metals whose ions catalyze hydrogen peroxide decomposition, whether such metals are present as components of or impurities in the aluminum compound. Because of the greater stability of hydrogen peroxide under acid or neutral conditions, aluminum compounds which form solutions in hydrogen peroxide having a pH not greater than about 8 are generally preferred, to those which form solutions of higher pH although the latter may be useful under certain special circumstances. Representative examples of suitable aluminum compounds are: aluminum sulfate, the sodium, potassium and ammonium alums, aluminum nitrate, aluminum bromate, aluminum chlorate and the like.

The dissolved aluminum will form a complex with the polycarboxyalkyl amine chelating agent and it may be added to the hydrogen peroxide in the form of such a complex which can be separately prepared using the stoichiometric proportions of any one or more of the foregoing aluminum compounds with the chosen chelating agent or mixture of such agents, or an excess of either of these components. However, as a general rule it will be simpler to add the aluminum compound and chelating agent to the hydrogen peroxide without pre-forming the complex therefrom. However, the formation of a complex of aluminum ion with the polycarboxyalkyl amine chelating agent is believed to explain in part the advantage of the stabilizer mixture of the invention over the prior hydrogen peroxide stabilizers.

While the particular mechanism whereby the improved results which are obtained is not to be considered a limitation on the invention, a theory which explains the way in which the three essential components of the stabilizer mixtures of the invention cooperate in protecting hydrogen peroxide from decomposition catalyzed by heavy metal ions present as impurities in the peroxide may nevertheless be helpful in making the invention clearer. As explained by Haber and Weiss, Proc. Royal Soc. (London), vol. A147, page 332 ff. (1934), the catalytic decomposition of hydrogen peroxide takes place by a free radical chain reaction in which the initiating free radicals are generated through the alternate oxidation and reduction of the catalyst metal ion by hydrogen peroxide. The catalyst metal ions most commonly encountered are iron, copper and chromium which are introduced into the peroxide as a result of contact of the hydrogen peroxide with metal containers in which these metals are present even though only in trace amounts. Because of the alternate oxidation and reduction there will be present metal ions in both a higher valence state (ferric, cupric and chromic ions for instance) and in a lower valence state (ferrous, cuprous, and chromous ions). The special type of polycarboxyalkyl amine chelating agents used in the invention, are capable of complexing with the catalytic metal ions, thus trapping the catalyst in one valence state and preventing the radical initiation of the peroxide decomposition. However, it has been found that when these chelating agents are complexed with heavy metal ions which are in the reduced valence state, the complexed metal ion is readily oxidized by the hydrogen peroxide to the higher valence state, and the chelating agent is destroyed in the process. The complex formed between the chelating agent and heavy metal ions in their higher valence state, on the other hand, are not reduced and are not attacked by the hydrogen peroxide and such complexed metal ions are effectively inactivated as catalysts of hydrogen peroxide decomposition.

The loss of chelating agent which takes place as a result of complex formation between it and heavy metal ions in their reduced valence state can be prevented by having sufficient aluminum ions present. Aluminum ions intervene by complexing with the chelating agnets used in the invention preferentially compared with the ions of of heavy metals in a reduced valence state. As a result the formation of undesirable complexes of reduced metal ions which lead to loss of chelating agent is suppressed. At the same time the desired complexes of chelating agent with catalytic metal ions in their higher valence state is not suppressed. This is because the special type of chelating agents which are used are those which form complexes with aluminum ions from which complexes heavy metal ions in their higher valence state will displace the aluminum. Thus for these chelating agents the equilibrium constants, K, for the forward reaction:

$$\text{Metal ion} + \text{chelating agent} \rightleftarrows \text{complex}$$

are of at least one, and preferably at least two, orders of magnitude greater when the metal ion is aluminum ion than when it is a heavy metal ion in its reduced valence state, but is at least one order greater, and preferably at least five orders of magnitude greater, when the metal ion is a heavy metal ion in its higher valence state than when it is aluminum ion. As a result of this relationship the aluminum ions protect the chelating agent from the loss which would result from its complexing with metal ions in the reduced state but do not interfere with the effectiveness of the chelating agent in inactivating heavy metal ions in their higher valence state as catalysts for hydrogen peroxide decomposition.

The water soluble phosphate used in the invention complexes the traces of heavy metal ions in their lower valence state which are excluded by the aluminum ions from complexing with the organic chelating agent. As a result decomposition of hydrogen peroxide initiated by free radicals formed by reaction of the $H_2O_2$ with the lower valence ions as in the following equation for reaction with ferrous ions is suppressed:

$$Fe^{++} + H_2O_2 \rightarrow Fe^{+++} + HO\cdot + OH^-$$

Also loss of chelating agent by the Fenton reaction, J. Chem. Soc. 65, 899 (1894), is avoided.

The amounts of polycarboxyalkyl amine chelating agent, aluminum compound and phosphate which are used can be varied. As a general rule about 1 to about 1000 milligrams of chelating agent per liter of hydrogen peroxide solution is suitable, but amounts between about 10 and about 250 milligrams per liter are usually more advantageous. The aluminum compound is preferably present in an amount sufficient to supply approximately the stoichiometric requirement of aluminum cation ($Al^{+++}$) for complexing with the chelating agent. Amounts of aluminum below this stoichiometric proportion are also useful and even much lower amounts can be present but generally at some sacrifice in the effectiveness of the stabilizer mixture. Larger amounts of aluminum ion can also be employed, the extreme upper limit usually being the solubility limit of the compound or mixture of compounds chosen. More advantageously not more than about 25 milligrams of aluminum per liter of $H_2O_2$ are used in order that there may not be such an excess as to interfere by mass action effect with the desired complexing of the heavy metal ions in higher valence state by the chelating agent and to avoid precipitation of aluminum phosphates. On this account most preferably not more than twice the stoichiometric amount of aluminum for complexing with the chelating agent is added.

The soluble phosphate or mixture of phosphates employed can be used in amounts of about 25 milligrams or more per liter of the hydrogen peroxide being stabilized. The upper limit in this case also being the solubility in the peroxide since as a general rule undissolved material is considered undesirable in hydrogen peroxide solutions. Usually it will be advantageous to use amounts of phosphate compound between about 50 and about 500 milligrams, most preferably about 100 to about 200 milligrams, per liter of the peroxide.

The stabilizer mixtures of the invention have the advantage over many stabilizer systems heretofore used in being highly effective over a relatively wide pH range. For best results, however, the hydrogen peroxide should be maintained acidic and advantageously at a pH of about 2.5 to about 6.0. The pH here referred to is that determined by direct reading of a pH meter corrected for $H_2O_2$ concentration effects as described by J. R. Kolczynski et al. in the Journal of the American Chemical Society, vol. 79, page 531 (1957). We shall refer to the uncorrected reading of a pH meter as the "direct pH" and to the corrected reading as the "aqueous equivalent pH." An aqueous equivalent pH of about 3.5 to 5.5 is especially advantageous in stabilization with the mixtures of the invention because in this range not only does the stabilizer mixture have a long effective life even at temperatures of about 100° C. but also the corrosion of aluminum containers is minimized. Since the phosphates, normally handled in salt form rather than as the free acids, are on the alkaline side of the desired pH range, it is advantageous to use the free acid form of the organic chelating agent. Thus the pH of the mixture can usually be adjusted to within the above-indicated desired range by properly proportioning the relative amounts of these additives. This reduces or eliminates the need for adding an extraneous acid for pH adjustment and hence minimizes the solids content of the peroxide.

The chelating agent, aluminum compound and phosphate can be introduced into the hydrogen peroxide which is to be stabilized in any suitable manner. They can be added successively or simultaneously in solid form or as solutions in water or other inert solvents or as concentrates in hydrogen peroxide of the same or different concentration. No other stabilizers are necessary and in most cases are undesirable in the new compositions of the invention although in certain circumstances those can be used which do not interfere with the three essential components of the new stabilizer mixture.

The following examples further illustrate the invention and show some of its advantages.

*Example I*

The essential requirement that all three of the components of the new stabilizer mixtures, namely polycarboxyalkyl chelating agent, dissolved aluminum and phosphate, be present in the hydrogen peroxide being stabilized is shown by the following results obtained with 35% w. hydrogen peroxide containing 0.10 milligram of iron added as ferrous sulfate when using ethylene diamine tetraacetic acid sodium salt (EDTA) as the chelating agent. The tests were carried out in 100 ml. volumetric flasks by adding aliquots of concentrated solutions of the indicated amounts of the additives to the hydrogen peroxide. The pH was adjusted and after thorough mixing each test solution was divided. Half was used for the decomposition rate determination which was carried out by measuring the rate of oxygen evolution during heating by immersion in a 100° C. bath for the indicated test periods. The other half was used for pH measurement thus avoiding contamination of the test solution by the pH meter electrodes. All glassware in contact with the solutions was thoroughly cleaned and passivated before each test by successive treatment with 10% NaOH, 35% $HNO_3$ and 90% $H_2O_2$, each for about 24 hours at room temperature, with rinses with deionized water between each treatment.

| Direct pH Reading on Test Solution | | Components of $H_2O_2$ Solution (milligrams per liter) | | | $H_2O_2$ Decomposition Rate (Percent per day at 100° C.) | Effective Life of Stabilizer or mixture (hrs.) |
|---|---|---|---|---|---|---|
| Initial | Final | Dissolved aluminum | Sodium pyrophosphate | EDTA | | |
| 2.7 | 2.9 | none | none | none | 120 | -------- |
| 2.5 | 3.3 | none | none | 50 | 45 | <0.5 |
| 2.4 | 2.8 | none | 125 | 50 | 24 | 5 |
| 2.5 | 3.5 | 5 | 110 | 40 | 3 | >97 |

*Example II*

Comparative tests carried out in the same way using 1,2 - diaminocyclohexane - N,N,N',N' - tetraacetic acid (DACHTA) as the chelating agent gave the following results when tested with 35% w. hydrogen peroxide containing as impurities 0.1 milligram of iron and 0.02 milligram of copper per liter, the initial pH being 2.5 by direct reading.

| Additive (milligrams per liter) | | | Final $H_2O_2$ Decomposition Rate (Percent per day at 100° C.) | Effective Inhibitor Life (Hrs. at 100° C.) |
|---|---|---|---|---|
| Dissolved aluminum | $Na_4P_2O_7$ | DACHTA | | |
| 0 | 0 | 0 | 1,000 | -------- |
| 5 | 110 | 0 | 40 | 2 |
| 0 | 110 | 50 | 67 | 3.1 |
| 5 | 110 | 50 | a 3.3 | >92 | a Only 1.3 % of the $H_2O_2$ was lost during the first 24 hours at 100° C.

The inhibitor was still functioning perfectly when the last of these tests was concluded after 92 hours.

These results are in contrast to those obtained with other types of amine chelating agents, thus when 50 milligrams per liter of 2,6-pyridinedicarboxylic acid, for example, is used instead of the 1,2-diaminocyclohexane-N,N,N',N'-tetracetic acid in the hydrogen peroxide, the final hydrogen peroxide decomposition rate was 37 and the inhibitor life was only 5 hours even though the peroxide contained no copper impurity, the amounts of dissolved aluminum and sodium pyrophosphate being the same (5 and 110 milligrams per liter, respectively).

*Example III*

A test was carried out as in Example I with 35% hydrogen peroxide which contained 0.017 milligram of iron, 0.002 milligram of copper and 0.003 milligram of chromium per liter as impurities using pentasodiumdiethylenetriamine pentaacetate as the chelating agent in an amount of 50 milligrams per liter together with 110 milligrams of sodium pyrophosphate and 4.5 milligrams of dissolved aluminum per liter. This combination of stabilizers at pH 2.5 gave an initial hydrogen peroxide decomposition rate of 1.2 percent loss in $H_2O_2$ in 24 hours at 100° C. compared with 14 for the same mixture at pH 2.8–2.9 without the chelating agent pentasodiumdiethylenetriamine pentaacetic acid. The effective life of the chelating agent at 100° C. in this test was in excess of 14 hours.

Other polycarboxyalkylamine chelating agents which can be used together with phosphate and dissolved aluminum in the same way in place of the pentasodium diethylenetriaminepentaacetate are: nitrilotriacetic acid, ethylenediamine - N(beta-hydroxyethyl) - N,N',N' - triacetic acid, and disodium ethylenediamine-N,N'-di-(ortho-hydroxyphenylacetic acid-N,N'-diacetate.

*Example IV*

The highly-contaminated 35% w. hydrogen peroxide solution of Example II was stabilized by adding 50 milligrams of 1,2-diaminocyclohexane-N,N,N',N'-tetraacetic acid as chelating agent plus 60 milligrams of trisodium orthophosphate plus 5 milligrams of dissolved aluminum per liter and then adjusting the direct reading pH to 2.6 with nitric acid. The final decomposition rate after 50 hours heating at 100° C. was only 4.3 percent per day, the inhibitor still being effective when the test was then discontinued. For comparison, the decomposition rate of the unstabilized blank was 1000 percent per day.

*Example V*

Another sample of the highly-contaminated 35% w. hydrogen peroxide solution of Examples II and IV was stabilized by adding 25 milligrams of 1,2-diaminocyclohexane-N,N,N',N'-tetraacetic acid plus 95 milligrams of Hexaphos, the sodium "Hexametaphosphate" marketed by Westvaco Chemical Company, plus 5 milligrams of dissolved aluminum per liter and adjusting the direct reading pH to 2.9 with nitric acid. The resulting solution lost only 2.2 percent of the hydrogen peroxide during the first 24 hours at 100° C. in the decomposition test, and when the test was concluded after 58 hours at 100° C. the instantaneous rate of decomposition was only 10 percent per day. For comparison, when the dissolved aluminum was omitted, the resulting solution lost 70 percent of the hydrogen peroxide during the first 24 hours at 100° C.

*Example VI*

Equally good results were obtained when the Hexaphos was replaced by Cyclophos, the cyclic tetrametaphosphate marketed by Victor Chemical Works. Still another sample of the highly-contaminated 35% w. hydrogen peroxide of Examples II, IV and V was stabilized by adding 25 milligrams of 1,2-diaminocyclohexane- N,N, N',N'-tetraacetic acid, 110 milligrams of Cyclophos and 5 milligrams of dissolved aluminum per liter and adjusting the direct reading pH to 2.9 with nitric acid. The resulting solution decomposed at the rate of only 2.3 percent per day at 100° C. and maintained that low rate without deviation throughout the test period of 58 hours at 100° C.

*Example VII*

Hydrogen peroxide solutions of any strength can be stabilized by the method of the invention, as shown by the following example. Hydrogen peroxide solutions of 80, 70, 35 and 6% w. strengths were prepared and were each contaminated highly by adding 0.1 milligram of iron plus 0.02 milligram of copper ion per liter of solution. These were each stabilized by adding 50 milligrams of 1,2-diaminocyclohexane-N,N,N',N'-tetraacetic acid plus 110 milligrams of tetrasodium pyrophosphate plus 5 milligrams dissolved aluminum per liter of solution. Each solution was acidified with nitric acid to the pH shown in the table below, and subjected to the usual accelerated decomposition test at 100° C. with the following results:

| $H_2O_2$, percent W. | pH | | $H_2O_2$ Decomp. Rate, percent per day at 100° C. |
|---|---|---|---|
| | Direct Reading | Aqueous Equivalent | |
| 6 | 4.9 | 5.0 | 2.8 |
| 35 | 3.2 | 4.2 | 1.8 |
| 70 | 2.1 | 5.0 | 1.5 |
| 80 | 1.1 | 4.8 | 3.4 |

We claim as our invention:

1. Hydrogen peroxide containing about 1 to about 100 milligrams of a water-soluble organic chelating agent having at least one trivalent nitrogen atom to which are attached at least two carboxyl groups which are each linked to said nitrogen atom by a saturated aliphatic hydrocarbon group of not more than two carbon atoms, per liter of hydrogen peroxide, together with from about 1 to 2 times the stoichiometric amount, based on the chelating agent, of a water-soluble aluminum compound for complexing with said chelating agent, and an amount of water-soluble phosphate between about 25 milligrams per liter of hydrogen peroxide and the solubility limit of said phosphate in hydrogen peroxide.

2. Hydrogen peroxide stabilized as in claim 1 wherein the aluminum compound is present in an amount sufficient to supply approximately one mole of dissolved aluminum cation ($Al^{+++}$) per mole of said chelating agent.

3. Hydrogen peroxide stabilized as in claim 2 wherein the amount of organic chelating agent is between about 10 and 250 milligrams per liter, and the amount of soluble phosphate is about 50 to about 500 milligrams per liter.

4. Aqueous hydrogen peroxide of at least 6% wt. concentration containing at least one but not more than 1000 milligrams of water soluble polycarboxyalkyl diamine having the two amine groups linked to adjacent carbon atoms and containing not more than two carbon atoms in each of said carboxyalkyl groups per liter of said aqueous peroxide, together with dissolved aluminum in an amount approximately equal to the stoichiometric requirement for complexing with said diamine and a soluble phosphate in an amount between about 25 milligrams per liter of hydrogen peroxide and the solubility limit of said phosphate in said hydrogen peroxide.

5. Aqueous hydrogen peroxide in accordance with claim 4 containing about 50 to about 500 milligrams per liter of alkali metal phosphate.

6. Aqueous hydrogen peroxide of at least 6% wt. concentration containing about 10 to about 250 milligrams per liter of ethylenediamine-N,N,N',N'-tetraacetic acid sodium salt together with about the stoichiometric equivalent of dissolved aluminum and between about 50 and about 500 milligrams per liter of soluble phosphate.

7. Aqueous hydrogen peroxide in accordance with claim 6 wherein the phosphate is sodium pyrophosphate.

8. Aqueous hydrogen peroxide of at least 6% wt. concentration containing about 3 to about 500 milligrams per liter of a 1,2-diaminocycloalkane-N,N,N',N'-tetraacetic acid sodium salt together with about the stoichiometric equivalent of dissolved aluminum and between about 50 and about 500 milligrams per liter of soluble phosphate.

9. Aqueous hydrogen peroxide in accordance with claim 8 containing 1,2-diaminocyclohexane-N,N,N',N'-tetraacetic acid sodium salt together with an alkali metal pyrophosphate.

10. A method of stabilizing hydrogen peroxide which comprises adding to the peroxide about 1 to about 1000 milligrams per liter of a water-soluble organic chelating agent having at least one trivalent nitrogen atom to which are attached at least two carboxyl groups which are each linked to said nitrogen atom by a saturated aliphatic hydrocarbon group of not more than two carbon atoms together with sufficient water soluble aluminum compound to form a complex with said chelating agent and between about 50 and about 500 milligrams per liter of a soluble phosphate.

References Cited in the file of this patent

UNITED STATES PATENTS

| 2,008,726 | Reichert | July 23, 1935 |
| 2,961,306 | Johnston | Nov. 22, 1960 |

FOREIGN PATENTS

| 721,317 | Germany | June 2, 1942 |

OTHER REFERENCES

Chaberet and Martell: "Organic Sequestering Agents," John Wiley and Sons, Inc., New York, June 23, 1959, pages 326–328.

UNITED STATES PATENT OFFICE
CERTIFICATE OF CORRECTION

Patent No. 3,053,634　　　　　　　　　　　September 11, 1962

Daniel B. Luten, Jr., et al.

It is hereby certified that error appears in the above numbered patent requiring correction and that the said Letters Patent should read as corrected below.

Column 8, line 22, for "100" read -- 1000 --.

Signed and sealed this 11th day of June 1963.

SEAL)
.ttest:

:RNEST W. SWIDER　　　　　　　　　　　DAVID L. LADD
.ttesting Officer　　　　　　　　　　　Commissioner of Patents